United States Patent
Lee et al.

(10) Patent No.: US 10,225,474 B2
(45) Date of Patent: Mar. 5, 2019

(54) IMAGE PROCESSING DEVICE AND SYSTEM

(71) Applicant: Samsung Electronics Co., Ltd., Suwon-si, Gyeonggi-do (KR)

(72) Inventors: Jee Hong Lee, Seoul (KR); Kwang Hyuk Bae, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/826,013

(22) Filed: Nov. 29, 2017

(65) Prior Publication Data

US 2018/0160044 A1 Jun. 7, 2018

(30) Foreign Application Priority Data

Dec. 5, 2016 (KR) .................. 10-2016-0164255

(51) Int. Cl.
*H04N 5/232* (2006.01)
*G06T 5/00* (2006.01)
(Continued)

(52) U.S. Cl.
CPC .......... *H04N 5/23267* (2013.01); *G06T 7/80* (2017.01); *H04N 5/23229* (2013.01); *G06T 2207/30244* (2013.01)

(58) Field of Classification Search
CPC .......... H04N 5/23229; H04N 5/23267; H04N 2201/327; G06T 5/001; G06T 5/20; G06T 5/40; G06T 5/004; G06T 2201/0051; G06K 9/40

USPC ................. 348/208.4, 208.3, 208.99, 47–52; 382/100, 254, 255, 266, 275; 345/647, 345/421, 419
See application file for complete search history.

(56) References Cited

U.S. PATENT DOCUMENTS 7,659,921 B2 * 2/2010 Aoyama .................. H04N 9/47
348/135
7,715,644 B2 * 12/2010 Kochi ...................... G06K 9/36
382/254

(Continued)

FOREIGN PATENT DOCUMENTS

| EP | 1936956 A2 | 6/2008 |
| KR | 10-0819301 B1 | 4/2008 |
| KR | 10-1433846 B1 | 8/2014 |

*Primary Examiner* — Marly S Camargo
(74) *Attorney, Agent, or Firm* — Harness, Dickey & Pierce, P.L.C.

(57) ABSTRACT

An image processing device includes a first image distortion correction circuit configured to receive a first image and first calibration data from a first camera module, and perform correction on the first image based on the first calibration data; a second image distortion correction circuit configured to receive a second image and second calibration data from a second camera module, receive a first tilt range from the first camera module, and perform correction on the second image based on the second calibration data and the first tilt range; and an image processing unit (IPU) configured to receive corrected first and second images from the first and second image distortion correction circuits, and perform image processing on the corrected first and second images, wherein the first image is obtained by correcting an image acquired from an image sensor of the first camera module based on the first tilt range.

20 Claims, 6 Drawing Sheets

(51) Int. Cl.
*G06T 7/80* (2017.01)
*G06T 5/20* (2006.01)
*G06K 9/40* (2006.01)

(56) References Cited

U.S. PATENT DOCUMENTS

| | | |
|---|---|---|
| 7,856,173 B2 | 12/2010 | Chujo et al. |
| 8,009,971 B2 | 8/2011 | Koo et al. |
| 8,325,243 B2 | 12/2012 | Watanabe et al. |
| 8,547,440 B2 | 10/2013 | Muukki |
| 8,723,969 B2 | 5/2014 | Garg et al. |
| 9,131,155 B1 | 9/2015 | Dolgin et al. |
| 9,177,368 B2 | 11/2015 | Cabral et al. |
| 9,185,291 B1 | 11/2015 | Shabtay et al. |
| 9,288,395 B2 | 3/2016 | Baer et al. |
| 2004/0201707 A1 | 10/2004 | Noguchi et al. |
| 2012/0105578 A1* | 5/2012 | Ohmiya .................. H04N 7/00 348/36 |
| 2012/0133779 A1* | 5/2012 | Ma .......................... G06K 9/36 382/289 |
| 2014/0071252 A1 | 3/2014 | Cuisenier et al. |
| 2014/0300706 A1 | 10/2014 | Song |
| 2015/0145965 A1* | 5/2015 | Livyatan ............ H04N 13/0246 13/246 |
| 2016/0007008 A1 | 1/2016 | Molgaard et al. |
| 2016/0105616 A1 | 4/2016 | Shabtay et al. |
| 2016/0353083 A1* | 12/2016 | Aoki .................. H04N 13/0216 348/47 |

\* cited by examiner

IMAGE PROCESSING DEVICE AND SYSTEM

CROSS-REFERENCE TO RELATED APPLICATION

This application claims priority under 35 U.S.C. § 119 to Korean Patent Application No. 10-2016-0164255 filed on Dec. 5, 2016 in the Korean Intellectual Property Office, the entire contents of which are incorporated herein by reference.

BACKGROUND

1. Technical Field

At least some example embodiments of the inventive concepts relate to an image processing device and a system including the same.

2. Description of the Related Art

An image system may include a plurality of camera modules. The image system including a plurality of camera modules may process images obtained from the plurality of camera modules to produce one image.

In recent years, in order to enhance the quality of an image obtained from a plurality of camera modules, all or part of the plurality of camera modules may include an image stabilizer. The image stabilizers included in all or part of the plurality of camera modules may be of the same kind or different kinds.

A plurality of images corrected by the image stabilizer may undergo a rectification step. When a plurality of images subjected to the rectification step are generated as one image, image distortion may occur. Also, when some images corrected by the image stabilizer and the remaining images not corrected by the image stabilizer are generated as one image, image distortion may occur.

SUMMARY

According to at least some example embodiments, an image processing device includes a first image distortion correction circuit configured to receive a first image and first calibration data from a first camera module, and generate a first corrected image by performing a first correction operation on the first image based on the first calibration data; a second image distortion correction circuit configured to receive a second image and second calibration data from a second camera module, receive a first tilt range from the first camera module, and generate a second corrected image by performing a second correction operation the second image based on the second calibration data and the first tilt range; and an image processing unit (IPU) configured to receive the first and second corrected images from the first and second image distortion correction circuits, and perform image processing on the first and second corrected images, wherein the first image is obtained by correcting an image acquired from an image sensor of the first camera module based on the first tilt range.

According to at least some example embodiments, an image processing device includes a first tilt range control circuit configured to output a first tilt limit value based on data received at image processing device from an input/output sensor; a first image distortion correction circuit configured to receive a first image and first calibration data from a first camera module, and generate a first corrected image by performing a first correction operation on the first image based on the first calibration data; a second image distortion correction circuit configured to receive a second image and second calibration data from a second camera module, and generate a second corrected image by performing a second correction operation on the second image based on the second calibration data; and an image processing unit (IPU) configured to receive first and second corrected images from the first and second image distortion correction circuits, and perform image processing, wherein the first image is obtained by correcting an image acquired from an image sensor of the first camera module based on a first tilt range which is a range in which a range of a first tilt value indicating a tilt degree of the first camera module overlaps a range of the first tilt limit value.

According to at least some example embodiments, an image processing system includes an application processor configured to receive a first image and first calibration data from a first camera module, generate a first corrected image by performing a first correction operation on the first image based on the first calibration data, receive second image and second calibration data from a second camera module, receive a first tilt range from the first camera module, generate a second corrected image by performing a second correction operation on the second image based on the second calibration data and the first tilt range, and perform image processing on the first and second corrected images.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and modules without departing from the scope of the inventive concepts.

Hereinafter, an image processing system according to at least some example embodiments of the inventive concepts will be described with reference to FIG. 1.

Figure 1:
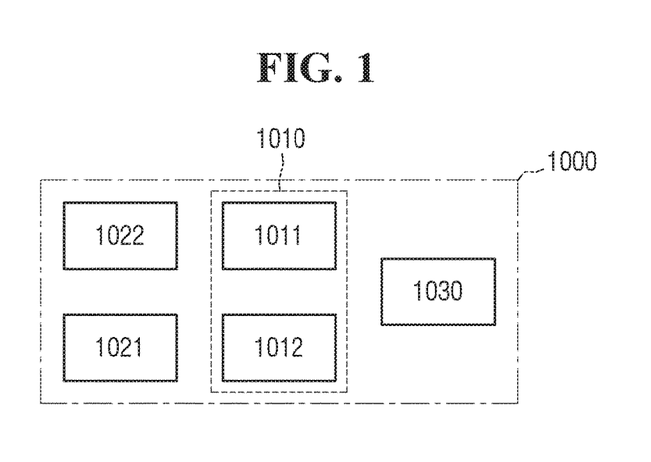
FIG. 1 is an example block diagram of an image processing system according to at least some example embodiments of the inventive concepts.

FIG. 1 is an example block diagram of an image processing system according to at least some example embodiments of the inventive concepts.

Referring to FIG. 1, an image processing system 1000 according to at least some example embodiments of the inventive concepts includes a plurality of camera modules 1021 and 1022, an application processor 1010, and an input/output sensor 1030. Although it is illustrated in the drawings that the image processing system 1000 includes only the plurality of camera modules 1021 and 1022, the application processor 1010, and the input/output sensor 1030, this arrangement is an example, and at least some example embodiments of the inventive concepts are not limited thereto. For example, the image processing system 1000 may further include other units such as an interface, if necessary. Also, although two camera modules 1021 and 1022 are illustrated in the drawings, at least some example embodiments of the inventive concepts are not limited thereto. For example, as needed, more than two camera modules may be included in the image processing system 1000.

The application processor 1010 may include, for example, an image processing device 1011, a memory system 1012, a central processing unit (CPU), a bus, a peripheral circuit, and the like. Here, the image processing device 1011 included in the application processor 1010 may be an image processing device The CPU may perform operations necessary for driving the image processing system 1000. According to at least some example embodiments of the inventive concepts, the CPU may be configured in a multi-core environment that includes a plurality of cores. According to at least some example embodiments of the inventive concepts, the application processor 1010 may include a microcontroller, a microprocessor, a multiprocessor and/or a multicore processor.

The bus may be used for data communication between the central processing unit, the image processing device 1011, the bus, the memory system 1012, and the peripheral circuit. According to at least some example embodiments of the inventive concepts, the bus may have a multi-layer structure. Examples of the bus included in the application processor 1010 include, but are not limited to, a multi-layer advanced high-performance bus (AHB) and a multi-layer advanced extensible interface (AXI).

According to at least some example embodiments of the inventive concepts, the memory system 1012 may provide an environment necessary for the application processor 1010 to be connected to an external memory and operate at a high speed. According to at least some example embodiments of the inventive concepts, the memory system may include a separate controller (e.g., controller circuit) for controlling the external memory.

The peripheral circuit may provide an environment necessary for the image processing system 1000 to be smoothly connected to an external device (for example, a mainboard or motherboard). Accordingly, the peripheral circuit may include various interfaces that allow external devices connected to the image processing system 1000 to be compatible with the image processing system 1000 and/or application processor 1010.

According to at least some example embodiments of the inventive concepts, the memory system 1012 may be or include an operation memory and/or main memory used by the application processor 1010 to operate. Though FIG. 1 illustrates an example in which the memory system is located within the application processor 1010, according to at least some example embodiments of the inventive concepts, the memory system 1012 may be located outside the application processor 1010. For example, the memory system 1012 may be packaged in a package on package (PoP) form with the application processor 1010.

The input/output sensor 1030, the plurality of camera modules 1021 and 1022 and the application processor 1010 may be coupled to each other via a bus, for example. The bus may correspond to a path through which data moves. The input/output sensor 1030 may sense a value directly set by the user with respect to the image processing system 1000 and transmit the sensed value to the image processing device 1011. For example, the input/output sensor 1030 may include one or more touchscreens, keys, buttons and/or dials.

Hereinafter, an image processing device and system according to at least some example embodiments of the inventive concepts will be described with reference to FIGS. 1 and 2.

Figure 2:
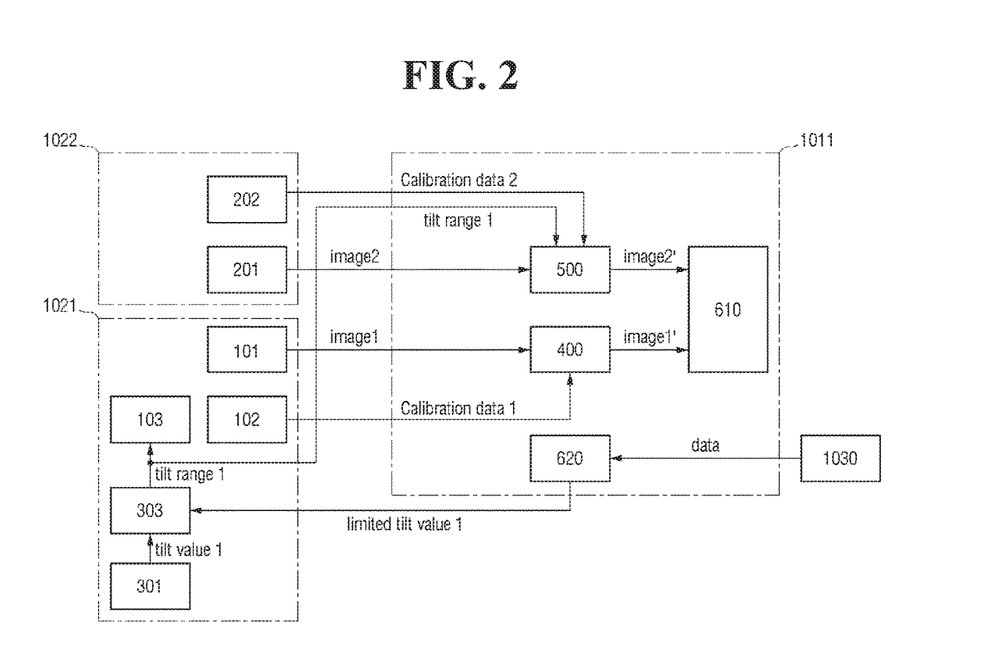
FIGS. 2 to 6 are example block diagrams of an image processing device according to at least some example embodiments of the inventive concepts.

FIG. 2 is an example block diagram illustrating an image processing device and system according to at least some example embodiments of the inventive concepts.

Referring to FIGS. 1 and 2, an image processing system according to at least one example embodiment of the inventive concepts may include a first camera module 1021, a second camera module 1022, the image processing device 1011, and the input/output sensor 1030.

The first camera module 1021 may include a first image sensor 101, a first storage device 102, a first image stabilizer 103, a first tilt sensor 301 and a first image stabilizer controller 303. The second camera module 1022 may include a second image sensor 201 and a second storage device 202. The focal lengths of the first camera module 1021 and the second camera module 1022 may be different from each other. For example, the focal length of the first camera module 1021 may be longer than the focal length of the second camera module 1022. According to at least some example embodiments of the inventive concepts, the first and second storage devices 102 and 202 are memories examples of which include, but are not limited to, random access memory (RAM), nonvolatile memory, and flash memory.

The first camera module 1021 and the second camera module 1022 may be spaced apart from each other.

The first image sensor 101 and the second image sensor 201 may acquire respective images for a subject. According to at least some example embodiments of the inventive concepts, the first image sensor 101 may acquire a left image, and the second image sensor 201 may acquire a right image. However, at least some example embodiments of the inventive concepts are not limited thereto. For example, according to at least some example embodiments of the inventive concepts, the first image sensor 101 may acquire a right image, and the second image sensor 201 may acquire a left image.

In the first storage device 102, first calibration data (calibration data 1) for the first camera module 1021 may be stored. The first calibration data may include one or more of, for example, the information about the optical axis, the focal length and the degree of rotation of the first camera module.

In the second storage device 202, second calibration data (calibration data 2) for the second camera module 1022 may be stored. The second calibration data may include one or more of, for example, the information about the optical axis, the focal length and the degree of rotation of the second camera module.

The first image stabilizer 103 may be disposed in the first camera module 1021. The first image stabilizer 103 may correct the image acquired from the first image sensor 101 based on a first tilt range (tilt range 1). According to at least some example embodiments of the inventive concepts, the first image stabilizer 103 may correct the image acquired from the first image sensor 101 using the optical axis information of the first camera module 1021. According to at least some example embodiments of the inventive concepts, the first image stabilizer 103 may correct the image acquired from the first image sensor 101 using, for example, the gyro information for the first camera module 1021. According to at least some example embodiments of the inventive concepts, the first image stabilizer 103 may include, for example, one or more of an electronic image stabilizer (EIS), an optical image stabilizer (UIS), and a sensor shift image stabilizer.

The first tilt sensor 301 may generate a first tilt value (tilt value 1) by sensing the degree of tilt of the first camera module 1021. In other words, the first tilt value may indicate the tilt degree of the first camera module 1021. The first tilt value (tilt value 1) may include optical axis information or gyro information of the first camera module 1021 according to the type of the first image stabilizer 103. The first tilt value (tilt value 1) may include an angle range in which the first camera module 1021 tilts, for example, at a moment when the first camera module 1021 obtains image data from the object. The first tilt value sensed by the first tilt sensor 301 may be provided to the first image stabilizer controller 303. According to at least some example embodiments of the inventive concepts, the first image stabilizer controller 303 may be embodied by a circuit or circuitry, and may also be referred to, in the present disclosure, as the first image stabilizer controller circuit 303.

The first image stabilizer controller 303 may receive the first tilt value from the first tilt sensor 301 and receive a first tilt limit value (limited tilt value 1) from a first tilt range control unit 620. The first tilt limit value will be described in detail later. The first image stabilizer controller 303 may generate the first tilt range based on the first tilt value and the first tilt limit value. For example, the first tilt range may be a range in which the range of the first tilt value overlaps the range of the first tilt limit value.

Although the drawings illustrate an example in which the first tilt sensor 301 and the first image stabilizer controller 303 are disposed in the first camera module 1021, at least some example embodiments of the inventive concepts are not limited thereto. For example, at least one of the first tilt sensor 301 and the first image stabilizer controller 303 may be disposed separately from the first camera module 1021.

The first camera module 1021 and the second camera module 1022 may provide a first image (image1) and a second image (image2) to the image processing device 1011, respectively.

According to at least some example embodiments of the inventive concepts, the first image may be an image obtained by correcting the image acquired from the first image sensor 101 based on the first tilt range. This is because the first camera module 1021 includes the first image stabilizer 103. On the other hand, the second image may not be an image corrected based on the tilt degree of the second camera module 1022, in some embodiments. That is, the second camera module 1022 may not include an image stabilizer.

Although the drawings illustrate an example in which the first image is transferred directly from the first image sensor 101 to the image processing device 1011, at least some example embodiments of the inventive concepts are not limited thereto. For example, according to at least some example embodiments of the inventive concepts, the first image may be provided to the image processing device 1011 through another unit. For example, the first image may be provided to the image processing device 1011 through an analog-to-digital converter. Similarly, the second image may be provided to the image processing device 1011 through another unit, for example, an analog-to-digital converter.

The image processing device 1011 may include a first image distortion correction unit 400, a second image distortion correction unit 500, an image processing unit (IPU) 610, and the first tilt range control unit 620. The image processing device 1011 may be part of the application processor, in some embodiments. The first image distortion correction unit 400, the second image distortion correction unit 500, and the first tilt range control unit 620 may also be referred to, in the present disclosure, as the first image distortion correction circuit 400, the second image distortion correction circuit 500, and the first tilt range control circuit 620, respectively.

According to at least some example embodiments of the inventive concepts, operations described in the present disclosure as being performed by the image processing device 1011 (and/or any element of the image processing device 1011) may be performed by circuitry configured to perform the operations, a processor (e.g., the application processor 1010) executing program code that is stored in a memory (e.g., the memory system 1012) and includes instructions corresponding to the operations, or a combination of the above-referenced circuitry and processor executing program code.

The first image distortion correction unit 400 may receive the first image and the first calibration data from the first camera module 1021. According to at least some example embodiments of the inventive concepts, the first image provided to the first image distortion correction unit 400 may be an image that has passed through an image signal processing processor that may be placed between the first camera module 1021 and the first image distortion correction unit 400. Further, according to at least some example embodiments of the inventive concepts, in addition to the first image and the first calibration data, the first image distortion correction unit 400 may receive other data used for performing correction on the first image.

The first image distortion correction unit 400 may perform a correction operation on the first image based on the first calibration data. Performing a correction operation may also be referred to, herein, as performing correction. For example, the first image distortion correction unit 400 may perform the correction operation by performing at least one of a calibration operation and a rectification operation on the first image.

The first tilt range control unit 620 may output the first tilt limit value based on data inputted from the input/output sensor 1030. For example, the first tilt range control unit 620 may output the first tilt limit value based on data received at the image processing device 1011 from the input/output sensor 1030. The data received from the input/output sensor 1030 may be include values, such as a zoom ratio and an illumination value, directly set by the user, or information on values that the user can adjust through the input/output sensor 1030.

The first tilt limit value may be a value that limits the range of the first tilt value. For example, when the focal lengths of the first camera module 1021 and the second camera module 1022 are different from each other, the first tilt range control unit 620 may determine the first tilt limit value based on the zoom ratio, which is one of the data set by the user. For example, the first tilt limit value for smooth switching from the first camera module 1021 to the second camera module 1022 may be obtained experimentally while varying the zoom ratio. in this case, for example, the first tilt value (tilt value 1) may include a range of angles.

Alternatively, for example, if the first camera module 1021 and the second camera module 1022 are a bayer camera and a monochrome camera, respectively, the first tilt range control unit 620 may determine the first tilt limit value based on an exposure time in a low illuminance environment, which is one of data set by the user. For example, the first tilt limit value may be obtained experimentally in consideration of an improvement in a signal-to-noise ratio (SNR) of the resulting image of the IPU 610 while varying the exposure time.

The first tilt range provided to the first image stabilizer 103 may be a range in which the range of the first tilt limit value overlaps the range of the first tilt value. For example, if the first tilt value (tilt value 1) is between about −5° and about 5° and the first tilt limit value (limited tilt value 1) is between about −1° and about 1°, then the first tilt range (tilt range 1) may be about −1° to about 1°.

The image processing device According to at least one example embodiment of the inventive concepts performs correction on the image using the first tilt range generated using the first tilt limit value. Accordingly, it is possible to reduce or, alternatively, minimize a difference in motion blur caused in low illuminance conditions or to induce a smooth transition between camera modules having different focal lengths.

The second image distortion correction unit 500 may receive the second image and the second calibration data from the second camera module 1022. Further, According to at least some example embodiments of the inventive concepts, the second image distortion correction unit 500 may receive the first tilt range from the first camera module 1021. According to at least some example embodiments of the inventive concepts, the second image provided to the second image distortion correction unit 500 may be an image that has passed through an image signal processing processor that may be placed between the second camera module 1022 and the second image distortion correction unit 500. Further, it is needless to say that in addition to the second image, the second calibration data and the first tilt range, the second image distortion correction unit 500 may receive other data as necessary to perform correction on the second image.

The second image distortion correction unit 500 may perform a correction operation on the second image based on the second calibration data and the first tilt range. For example, the second image distortion correction unit 500 may perform the correction operation, on the second image, by performing at least one of a rectification operation and a de-blur operation for removing a blur effect from the second image.

In the image processing device According to at least one example embodiment of the inventive concepts, the second image distortion correction unit 500 may perform correction on the second image based on the first tilt range, thereby generating a corrected image with reduced or, alternatively, minimized motion blur, misalignment and the like. That is, an image generated from a camera module that does not include an image stabilizer is corrected by using the tilt range (e.g., the first tilt range) used in a camera module including an image stabilizer. Accordingly, even a camera module that does not include an image stabilizer can cause a correction effect of an image stabilizer.

The IPU 610 may receive a corrected first image (image 1') from the first image distortion correction unit 400 and a corrected second image (image 2') from the second image distortion correction unit 500. The IPU 610 may perform image processing on the corrected first and second images (image 1', image 2'). The corrected first image may also be referred to, in the present disclosure, as the first corrected image, and the corrected second image may also be referred to, in the present disclosure, as the second corrected image.

The image processing device 1011 may be part of the application processor 1010, for example. Further, although only certain units are shown in the drawings, this is merely for simplicity of description, and at least some example embodiments of the inventive concepts are not limited thereto. If necessary, the image processing device 1011 may include various units.

Hereinafter, an image processing device according to at least some example embodiments of the inventive concepts will be described with reference to FIGS. 1 and 3. For the sake of clarity of explanation, a repeated description of those described above will be omitted.

Figure 3:
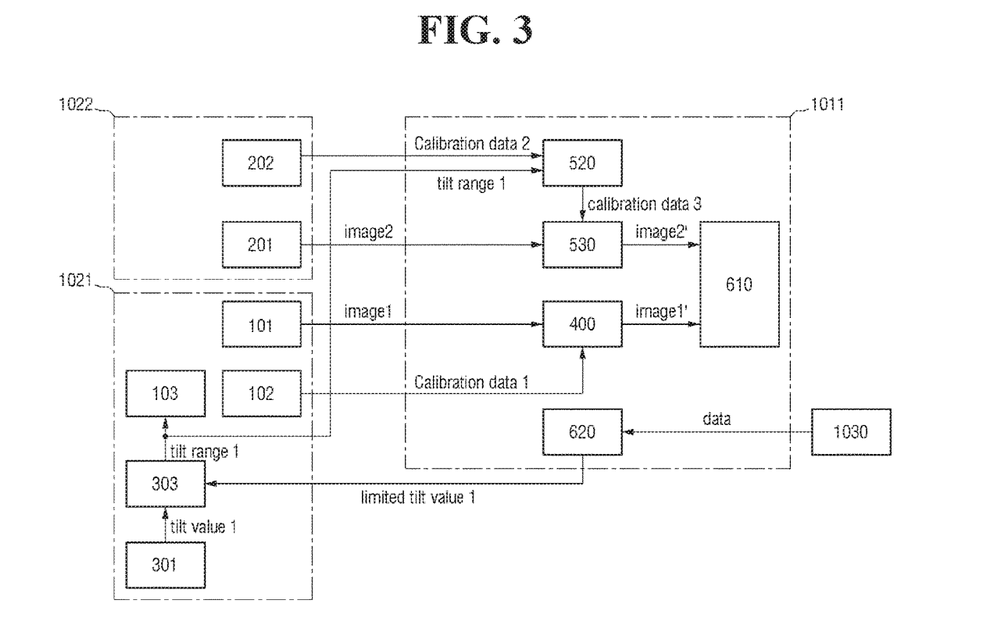

FIG. 3 is a block diagram of an image processing device according to at least some example embodiments of the inventive concepts.

Referring to FIGS. 1 and 3, the image processing device 1011 according to at least some example embodiments of the inventive concepts may include a calibration data regeneration unit 520 and a rectification unit 530. The calibration data regeneration unit 520 and the rectification unit 530 may also be referred to, in the present disclosure, as the calibration data regeneration circuit 520 and the rectification circuit 530, respectively.

The calibration data regeneration unit 520 may receive the second image and the second calibration data from the second camera module 1022, and receive the first tilt range from the first camera module 1021.

According to at least some example embodiments of the inventive concepts, the second image may not be an that is not corrected based on the tilt degree of the second camera module 1022. According to at least some example embodiments of the inventive concepts, the second camera module 1022 may not include an image stabilizer.

The first tilt range may be a range in which the range of the first tilt value of the first camera module 1021 overlaps the range of the first tilt limit value generated by the first tilt range control unit 620. The first tilt range may be provided from the first camera module 1021, for example.

The calibration data regeneration unit 520 may generate third calibration data by modifying the second calibration data based on the first tilt range. In other words, the third calibration data may be data obtained by modifying or adjusting the second calibration data for the second camera module 1022 based on the first tilt range for the first camera module 1021.

The rectification unit 530 may perform correction (e.g., rectification) on the second image based on the third calibration data provided from the calibration data regeneration unit 520. For example, the rectification unit 530 perform at least one of a calibration operation and a rectification operation on the second image.

The corrected second image (image 2') generated from the rectification unit 530 may be an image on which a correction operation has been performed by reflecting the first tilt value of the first camera module 1021. In other words, information on the tilt degree of the first camera module 1021 may be reflected in the corrected second image.

That is, in the image processing device According to at least one example embodiment of the inventive concepts, the calibration data regeneration unit 520 receives the first tilt range, generates the corrected second calibration data (i.e., the third calibration data) based on the first tilt range, and corrects the second image using the corrected second calibration data (i.e., the third calibration data). Accordingly, it is possible to cause a correction effect of an image stabilizer for an image (e.g., the second image) generated from a camera module that does not include an image stabilizer.

Hereinafter, an image processing device according to at least some example embodiments of the inventive concepts will be described with reference to FIGS. 1 and 4. For the sake of clarity of explanation, a repeated description of those described above will be omitted.

Figure 4:
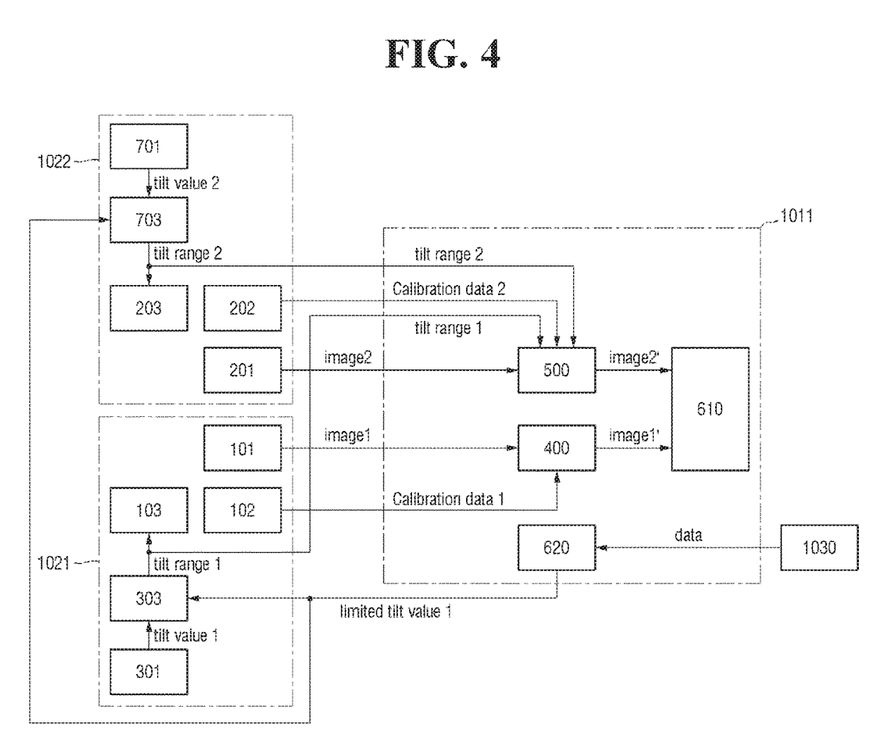

FIG. 4 is a block diagram of an image processing device according to at least some example embodiments of the inventive concepts.

Referring to FIGS. 1 and 4, the second image distortion correction unit 500 of the image processing device 1011 according to at least some example embodiments of the inventive concepts may perform correction on the second image based on the second calibration data, the first tilt range (tilt range 1) and a second tilt range (tilt range 2). For example, the second image distortion correction unit 500 may perform correction for the second image (image 2) based on the second tilt range (tilt range 2), and perform an operation for matching the first image (image 1) based on the first tilt range (tilt range 1) with respect to the corrected second image (image 2). However, the present inventive concept is not limited thereto. For example, the second image distortion correction unit 500 can correct the second image (image 2) in various correction operations or correction sequences, base on the second calibration data (calibration data 2), the first tilt range 1 and the second tilt range 2.

The second tilt range may be, for example, a range in which the range of a second tilt value (tilt value 2) indicating the tilt degree of the second camera module 1022 overlaps the range of the first tilt limit value. Also, the second image may be an image obtained by correcting the image acquired from the second image sensor 201 based on the second tilt range for the second camera module 1022.

Specifically, the second camera module 1022 may include, for example, a second tilt sensor 701, a second image stabilizer controller 703, and a second image stabilizer 203. According to at least some example embodiments of the inventive concepts, the second image stabilizer controller 703 may be embodied by a circuit or circuitry, and may also be referred to, in the present disclosure, as the second image stabilizer controller circuit 703.

The second image stabilizer 203 may be disposed in the second camera module 1022. The second image stabilizer 203 may correct the image acquired from the second image sensor 201 based on the second tilt range. According to at least some example embodiments of the inventive concepts, the second image stabilizer 203 may include, for example, one or more of an EIS, an OIS, and a sensor shift image stabilizer. For example, the second image stabilizer 203 may be of the same kind as or a different kind from the first image stabilizer 103.

The second tilt sensor 701 may generate the second tilt value by sensing the tilt degree of the second camera module 1022. In other words, the second tilt value may indicate the tilt degree of the second camera module 1022. The second tilt value sensed by the second tilt sensor 701 may be provided to the second image stabilizer controller 703.

The second image stabilizer controller 703 may receive the second tilt value from the second tilt sensor 701, and receive the first tilt limit value from the first tilt range control unit 620. The second image stabilizer controller 703 may generate the second tilt range based on the second tilt value and the first tilt limit value.

Although it is illustrated in the drawings that the second tilt sensor 701 and the second image stabilizer controller 703 are disposed in the second camera module 1022, at least some example embodiments of the inventive concepts are not limited thereto. For example, at least one of the second tilt sensor 701 and the second image stabilizer controller 703 may be disposed separately from the second camera module 1022.

The second image distortion correction unit 500 may receive the second image, the second calibration data and the second tilt range from the second camera module 1022, and receive the first tilt range from the first camera module 1021. The second image distortion correction unit 500 may perform correction on the second image based on the second calibration data, the first tilt range and the second tilt range.

In the image processing device According to at least one example embodiment of the inventive concepts, the second image distortion correction unit 500 may perform correction on the second image based on the first tilt range and the second tilt range, thereby generating a corrected image with reduced or, alternatively, minimized motion blur, misalignment and the like, in consideration of a difference between the first image and the second image caused when different kinds of image stabilizers are included in the first camera module 1021 and the second camera module 1022. Further, even when the same kind of image stabilizers are included in the first camera module 1021 and the second camera module 1022, it is possible to reduce or, alternatively, minimize a distortion of the image due to a difference between the first image and the second image by generating an improved or, alternatively, optimal first tilt range and an improved or, alternatively, optimal second tilt range using the first tilt limit value.

Hereinafter, an image processing device according to at least some example embodiments of the inventive concepts will be described with reference to FIGS. 1 and 5. For the sake of clarity of explanation, a repeated description of those described above will be omitted.

Figure 5:
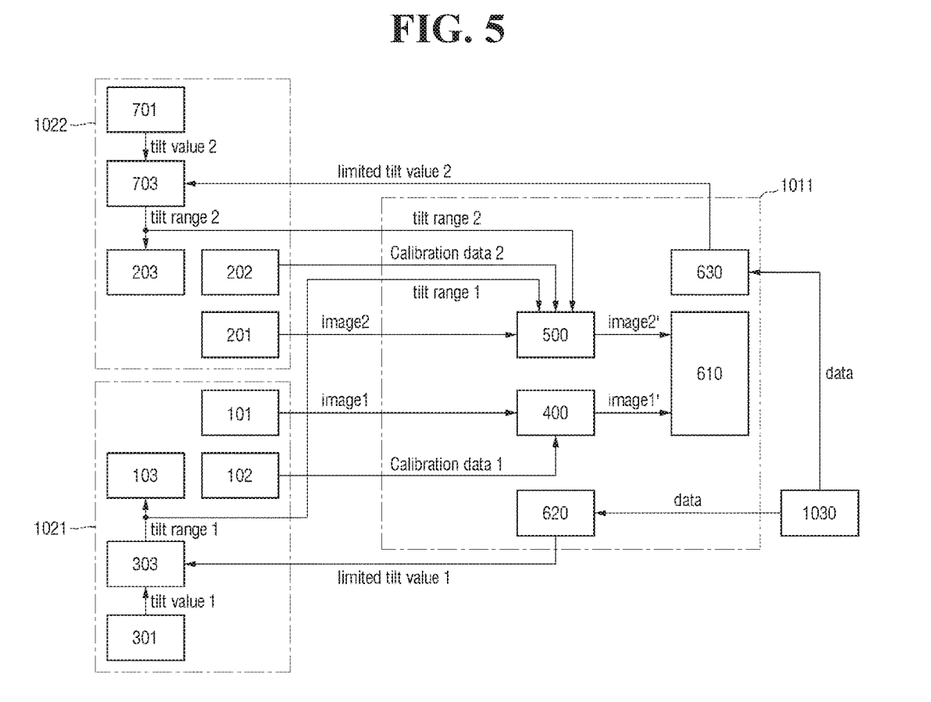

FIG. 5 is a block diagram of an image processing device according to at least some example embodiments of the inventive concepts.

Referring to FIGS. 1 and 5, the second tilt range of the image processing device 1011 according to at least some example embodiments of the inventive concepts may be a range in which the range of the second tilt value overlaps the range of a second tilt limit value (limited tilt value 2).

Specifically, the image processing device 1011 may further include a second tilt range control unit 630. The second tilt range control unit 630 may output the second tilt limit value based on the data inputted from the input/output sensor 1030. The second tilt limit value may be a value that limits the range of the second tilt value. The second tilt limit value may be obtained in a manner substantially similar to the method of obtaining the first tilt limit value. The second tilt limit value may have the same range as the first tilt limit value, or may have a range that does not overlap the range of the first tilt limit value. Alternatively, the range of the second tilt limit value may partially overlap the range of the first tilt limit value.

The second image distortion correction unit 500 may receive the second image, the second calibration data and the second tilt range from the second camera module 1022, and receive the first tilt range from the first camera module 1021 to perform correction on the second image.

The image processing device 1011 According to at least one example embodiment of the inventive concepts may generate an improved or, alternatively, optimal first tilt range and an improved or, alternatively, optimal second tilt range by generating the tilt limit values for the respective camera modules 1021 and 1022. Accordingly, it is possible to reduce or, alternatively, minimize a distortion of the image due to a difference between the first image and the second image generated from the first camera module 1021 and the second camera module 1022 including the same kind or different kinds of image stabilizers.

Hereinafter, an image processing device according to at least some example embodiments of the inventive concepts will be described with reference to FIGS. 1 and 6. For the sake of clarity of explanation, a repeated description of those described above will be omitted.

Figure 6:
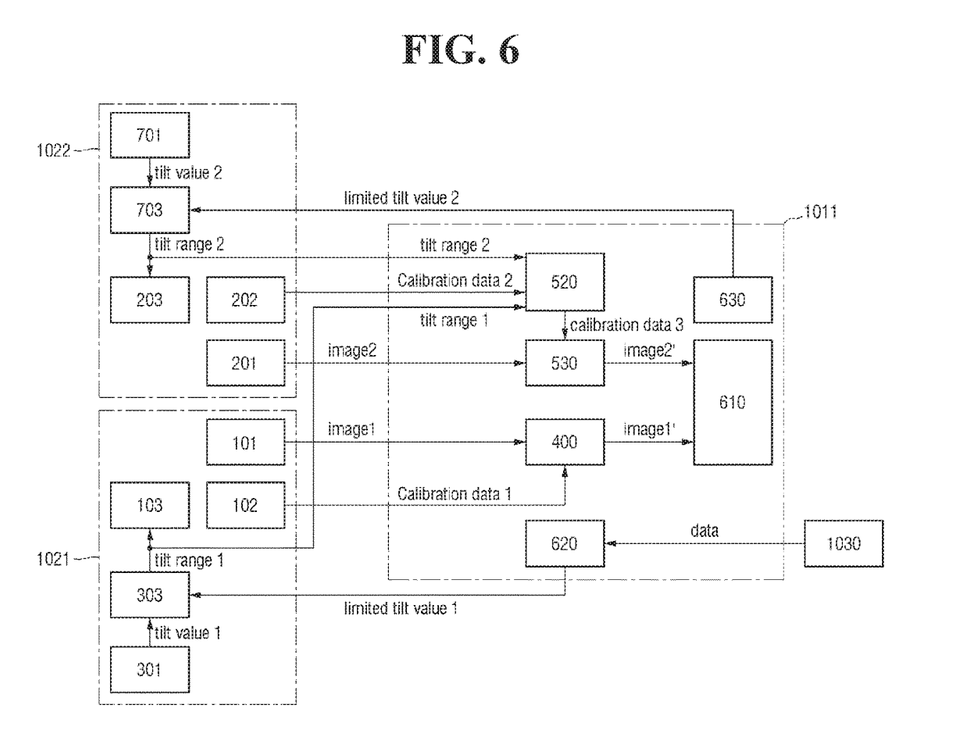

FIG. 6 is a block diagram of an image processing device according to at least some example embodiments of the inventive concepts.

Referring to FIGS. 1 and 6, the image processing device 1011 according to at least some example embodiments of the inventive concepts may include the calibration data regeneration unit 520 and the rectification unit 530.

The calibration data regeneration unit 520 may receive the second image, the second calibration data and the second tilt range from the second camera module 1022, and receive the first tilt range from the first camera module 1021.

Although it is illustrated in the drawings that the second tilt range is a range generated based on the second tilt limit value, at least some example embodiments of the inventive concepts are not limited thereto. For example, the second tilt range may be a range generated based on the first tilt limit value.

The calibration data regeneration unit 520 may generate third calibration data by modifying the second calibration data based on the first tilt range and the second tilt range. In other words, the third calibration data may be obtained by reflecting the first tilt range for the first camera module 1021 and the second tilt range for the second camera module 1022 in the second calibration data for the second camera module 1022.

The corrected second image generated from the rectification unit 530 may be an image on which a correction operation has been performed by reflecting the first tilt value of the first camera module 1021 and the second tilt value of the second camera module 1022. In other words, both information on the tilt degree of the first camera module 1021 and information on the tilt degree of the second camera module 1022 may be reflected in the corrected second image.

In the image processing device According to at least one example embodiment of the inventive concepts, the calibration data regeneration unit 520 may generate the corrected second calibration data (i.e., the third calibration data) based on the first tilt range and the second tilt range, and correct the second image using the corrected second calibration data (i.e., the third calibration data), thereby generating an image with reduced or, alternatively, minimized distortion, in consideration of a difference between the images generated from the camera modules including the same kind or different kinds of image stabilizers.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image processing device comprising:
a first image distortion correction circuit configured to receive a first image and first calibration data from a first camera module, and generate a first corrected image by performing a first correction operation on the first image based on the first calibration data;
a second image distortion correction circuit configured to receive a second image and second calibration data from a second camera module, receive a first tilt range from the first camera module, and generate a second corrected image by performing a second correction operation on the second image based on the second calibration data and the first tilt range; and
an image processing unit (IPU) configured to receive the first and second corrected images from the first and second image distortion correction circuits, and perform image processing on the first and second corrected images,
wherein the first image is obtained by correcting an image acquired from an image sensor of the first camera module based on the first tilt range.

2. The image processing device of claim 1, wherein the first tilt range is a range in which a range of a first tilt value indicating a tilt degree of the first camera module overlaps a range of a first tilt limit value based on data inputted from an input/output sensor.

3. The image processing device of claim 1, wherein the second image distortion correction circuit comprises:
a calibration data regeneration circuit configured to generate third calibration data by modifying the second calibration data based on the first tilt range; and
a rectification circuit configured to receive the third calibration data and perform rectification on the second image based on the third calibration data to output the second corrected image.

4. The image processing device of claim 1, wherein the second image is obtained by correcting an image acquired from an image sensor of the second camera module based on a second tilt range for the second camera module, and
wherein the second image distortion correction circuit performs correction on the second image based on the second calibration data, the first tilt range and the second tilt range.

5. The image processing device of claim 4, wherein the first tilt range is a range in which a range of a first tilt value indicating a tilt degree of the first camera module overlaps a range of a first tilt limit value based on data received at the image processing device from an input/output sensor, and
wherein the second tilt range is a range in which a range of a second tilt value indicating a tilt degree of the second camera module overlaps a range of a second tilt limit value based on the data.

6. The image processing device of claim 4, wherein the first tilt range is a range in which a range of a first tilt value indicating a tilt degree of the first camera module overlaps a range of a first tilt limit value based on data received at the image processing device from an input/output sensor, and wherein the second tilt range is a range in which a range of a second tilt value indicating a tilt degree of the second camera module overlaps a range of the first tilt limit value.

7. The image processing device of claim 4, wherein the second image distortion correction circuit comprises:
   a calibration data regeneration circuit configured to generate third calibration data by modifying the first calibration data based on the first and second tilt ranges; and
   a rectification circuit configured to receive the third calibration data and perform rectification on the second image to output the second corrected image.

8. The image processing device of claim 1, wherein the second image distortion correction circuit is configured such that the second correction operation performed on the second image by the second image distortion correction circuit includes at least one of a calibration operation performed on the second image based on the second calibration data, a rectification operation for the second image and a de-blur operation for removing a blur effect from the second image.

9. An image processing device comprising:
   a first tilt range control circuit configured to output a first tilt limit value based on data received at image processing device from an input/output sensor;
   a first image distortion correction circuit configured to receive a first image and first calibration data from a first camera module, and generate a first corrected image by performing a first correction operation on the first image based on the first calibration data;
   a second image distortion correction circuit configured to receive a second image and second calibration data from a second camera module, and generate a second corrected image by performing a second correction operation on the second image based on the second calibration data; and
   an image processing unit (IPU) configured to receive first and second corrected images from the first and second image distortion correction circuits, and perform image processing,
   wherein the first image is obtained by correcting an image acquired from an image sensor of the first camera module based on a first tilt range which is a range in which a range of a first tilt value indicating a tilt degree of the first camera module overlaps a range of the first tilt limit value.

10. The image processing device of claim 9, wherein the second image distortion correction circuit further receives the first tilt range, and performs correction on the second image based on the first tilt range and the second calibration data.

11. The image processing device of claim 10, wherein the second image distortion correction circuit comprises:
   a calibration data regeneration circuit configured to generate third calibration data by modifying the second calibration data based on the first tilt range; and
   a rectification circuit configured to receive the third calibration data and perform rectification on the second image based on the third calibration data to output the second corrected image.

12. The image processing device of claim 9, wherein, the second image distortion correction circuit is further configured to receive the first tilt range, and perform correction on the second image based on the first tilt range and the second calibration data, and
   the second image distortion correction circuit comprises:
   a calibration data regeneration circuit configured to generate third calibration data by modifying the second calibration data based on the first tilt range; and
   a rectification circuit configured to receive the third calibration data and perform rectification on the second image based on the third calibration data to output the second corrected image.

13. The image processing device of claim 9, wherein the second image is obtained by correcting an image acquired from an image sensor of the second camera module based on a second tilt range for the second camera module, and
   wherein the second image distortion correction circuit is further configured to receive the first and second tilt ranges, and perform correction on the second image based on the first and second tilt ranges and the second calibration data.

14. The image processing device of claim 13, wherein the second tilt range is a range in which a range of a second tilt value indicating a tilt degree of the second camera module overlaps a range of the first tilt limit value.

15. The image processing device of claim 13, further comprising:
   a second tilt range control circuit configured to output a second tilt limit value based on the data received from the input/output sensor,
   wherein the second tilt range is a range in which a range of a second tilt value indicating a tilt degree of the second camera module overlaps a range of the second tilt limit value.

16. An image processing system comprising:
   an application processor configured to,
   receive a first image and first calibration data from a first camera module,
   generate a first corrected image by performing a first correction operation on the first image based on the first calibration data,
   receive second image and second calibration data from a second camera module,
   receive a first tilt range from the first camera module,
   generate a second corrected image by performing a second correction operation on the second image based on the second calibration data and the first tilt range, and
   perform image processing on the first and second corrected images.

17. The image processing system of claim 16, wherein, the application processor is further configured to,
   generate third calibration data by modifying the second calibration data based on the first tilt range, and
   perform the second correction operation based on the third calibration data.

18. The image processing system of claim 16, further comprising:
   the first and second camera modules,
   the first camera module including,
   a first image sensor configured to capture an image, and
   a first image stabilizer configured to correct the image captured by the first image sensor based on the first tilt range, the second camera module including a second image sensor configured to capture an image, the first image being an image resulting from the correction performed by the first image stabilizer.

19. The image processing system of claim 18, wherein, the application processor is further configured to, generate third calibration data by modifying the second calibration data based on the first tilt range, and perform the second correction operation based on the third calibration data.

20. The image processing system of claim 18, wherein, the second camera module further includes a second image stabilizer configured to correct the image captured by the second image sensor, the second image being an image resulting from the correction performed by the second image stabilizer.

* * * * *